March 10, 1931.  U. WILCK  1,795,532

FORCEPS OR SCISSORS-LIKE SURGICAL INSTRUMENT

Filed March 6, 1930

Patented Mar. 10, 1931

1,795,532

UNITED STATES PATENT OFFICE

ULRICH WILCK, OF ESSEN, GERMANY, ASSIGNOR TO FRIED. KRUPP AKTIENGESELLSCHAFT, OF ESSEN-ON-THE-RUHR, GERMANY

FORCEPS OR SCISSORS-LIKE SURGICAL INSTRUMENT

Application filed March 6, 1930, Serial No. 433,754, and in Germany April 17, 1929.

The subject-matter of the invention is a forceps or scissor-like instrument intended for surgical purposes and more particularly manufactured from corrosion-proof steel, in which in the region of the pivot pin the one leg is embraced by the other. The invention has for its object to so improve instruments of this class that they can be accurately finished in all places and that, further, no twisting of the two legs relatively to one another in transverse direction occurs even when high pressures are applied.

This object is obtained according to the invention by the fact that the one leg consists of two parts which after assemblage embrace the other leg and are so shaped that they take part in the transmission of the turning moment substantially share and share alike.

In order that the invention can be more readily understood, an embodiment of the same is illustrated by way of example in the accompanying drawing in which Figure 1 is a lateral view of the instrument, Figure 2 is the left-hand end view thereof, partly in section on the broken line 2—2 of Figure 1.

Figure 1:
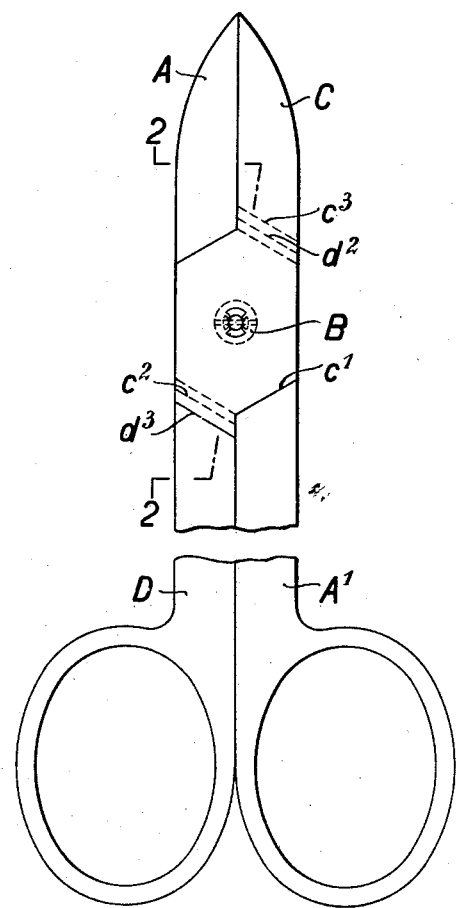
Figure 2:
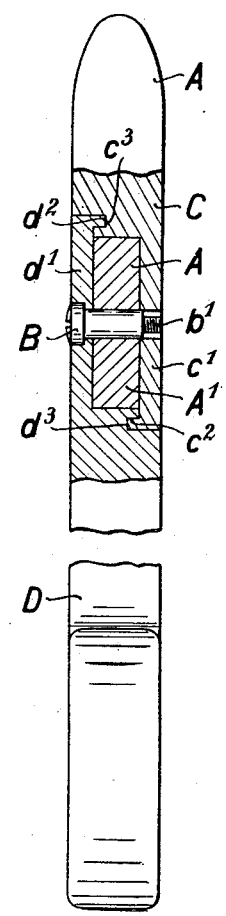
Figure 3:
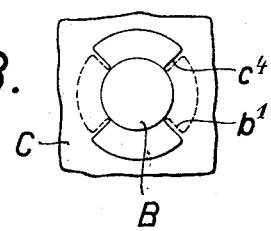
Figure 3 shows a detail of Figure 1 on enlarged scale.
Figure 4:
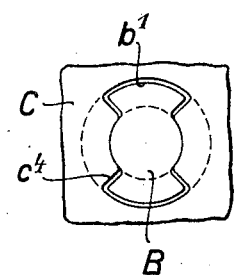
Figure 4 shows the same detail with the pivot pin interconnecting the two legs of the instrument in another position.

Referring to these Figures, A $A^1$ denotes the one leg of a forceps which leg is made in one piece and is embraced by the other leg in the region of the pivot pin B. This other leg is made in two pieces and consists of a front part C and a rear part D. The front part C, see best Figure 2, so far extends rearward by a prolongation $c^1$ that it engages the rear part D behind the pivot pin B. To this end the prolongation $c^1$ is provided with an inside rib $c^2$ which engages a corresponding groove $d^3$ provided on the rear part D. In a corresponding manner the rear part D is provided on the other side of the leg A $A^1$ and in front of pin B with a prolongation $d^1$ and a rib $d^2$ thereon that engages a groove $c^3$ of part C. The pivot pin B is provided on its free end with interrupted screw threads $b^1$ which in the position illustrated in Figures 1 and 3 engage corresponding female threads $c^4$ of the prolongation $c^1$ of part C and thus hold the pin B in position. In the position to be seen from Figure 4 the pin B is shown turned 90 degrees so that the threads $b^1$ and $c^4$ release one another and pin B can be withdrawn.

After withdrawal of pin B the instrument can be disassembled in such a manner that the individual parts can be thoroughly cleaned. The same holds good of their machining during the manufacture of the instrument. It may be noted in this connection that the known construction in which the one leg is passed through an eye provided on the other leg in the range of the pivot pin cannot be adapted satisfactorily for instruments made from corrosion-proof steel by the reason that after the leg has been passed through this eye, the latter must be compressed in hot state and that, as it is desirable with the application of corrosion-proof steel, after this heat treatment the scale cannot be removed from the assembled instrument on the places in the region of the eye which then are not longer accessible. Owing to the prolongations $c^1$ and $d^1$ situated on both sides of the leg A $A^1$ taking part substantially share and share alike in the transmission of the turning moment from the rear part D to the front part C of leg C D, no twisting in transverse direction of the two legs C D and A $A^1$ is to be feared.

The two leg parts C and D are so interconnected by the ribs $c^2$ and $d^2$ and the appurtenant grooves $d^3$ and $c^3$ on their places of contact, that the pivot pin B remains free from the special stresses that ordinarily would arise due to the subdivision of leg C D. This is accomplished by making the shape of the grooves $d^3$ and $c^3$ and the corresponding shape of the cooperating ribs $c^2$ and $d^2$ substantially alike so that the ribs $c^2$ and $d^2$ fit snugly into the grooves $d^3$ and $c^3$. Thus any tendency for the part C to turn with respect to part D is opposed by the grooves $d^3$ and $c^3$ cooperating with the ribs $c^2$ and $d^2$. None of the stresses which arise due to any said tendency to turn are transmitted to the pin B.

Furthermore, as the pivot pin B is secured on part C against axial displacement by a slotted-screw joint $b^1 c^4$, it can be easily removed and the instrument thus quickly disassembled.

Finally, the ribs $c^2$ and $d^2$ can be replaced by pins engaging corresponding bores of the opposite part.

What I claim and desire to secure by Letters Patent, is:—

1. An instrument of the class described comprising two legs one of which has a slot wherein the other is lodged, means for pivotally connecting said legs, said slotted leg consisting of two parts, a portion of one of said parts lying on one side of the other of said legs, and a portion of the other of said parts lying on the other side of said other leg, and means on both sides of said other leg non-rotatably interconnecting said two parts.

2. An instrument of the class described comprising two legs one of which has a slot wherein the other is lodged, a pivot pin pivotally connecting said legs, said slotted leg consisting of a front part situated in front of the pivot pin and of a rear part situated behind said pivot pin, each of said parts having a prolongation each extending on one side of said other of said leg and connected to the other parts, said pin passing through said prolongations and said other leg.

3. An instrument of the class described comprising two legs one of which has a slot wherein the other is lodged, a pivot pin pivotally interconnecting said legs, said slotted leg consisting of a front part situated in front of the pivot pin and of a rear part situated behind said pivot pin, each of said parts having a prolongation each extending on one side of said other leg and readily detachably connected to the other of said parts, the pin of said pivot joint passing through said prolongations and said other leg.

4. An instrument of the class described comprising two legs one of which has a slot wherein the other is lodged, a pivot pin pivotally interconnecting said legs, said slotted leg consisting of a front part situated in front of the pivot pin and of a rear part situated behind said pivot pin, each of said parts having a prolongation each extending on one side of said other leg and connected by a feather and groove to the other of said parts, the pin of said pivot joint passing through said prolongations and said other leg.

5. A device as defined in claim 1 in which said means for pivotally connecting said legs comprises a pivot pin in which is provided a slotted screw engagement by the said pin and said first-named leg.

6. An instrument of the class described comprising two legs one of which has a slot wherein the other is lodged, a pivot pin pivotally interconnecting said legs, said slotted leg consisting of a front part situated in front of the pivot pin and of a rear part situated behind said pin, each of said parts having a prolongation each extending on one side of said other leg and connected by a feather and groove to the other part, the pin of said pivot joint passing through said prolongations and said other leg, a slotted-screw engagement being provided between the free end of said pin and the adjacent one of said prolongations.

The foregoing specification signed at Cologne, Germany, this 13th day of February, 1930.

ULRICH WILCK.

CERTIFICATE OF CORRECTION.

Patent No. 1,795,532. Granted March 10, 1931, to

ULRICH WILCK.

It is hereby certified that error appears in the printed specification of the above numbered patent requiring correction as follows: Page 2, line 32, claim 2, strike out the words "of said" and insert the same to follow after the word "other" in line 33; and that the said Letters Patent should be read with this correction therein that the same may conform to the record of the case in the Patent Office.

Signed and sealed this 14th day of April, A. D. 1931.

(Seal)

M. J. Moore,
Acting Commissioner of Patents.